No. 804,300. PATENTED NOV. 14, 1905.
L. BLINDE.
HARROW.
APPLICATION FILED MAR. 21, 1905.

3 SHEETS—SHEET 1.

Witnesses
C. H. Reichenbach
E. M. Colford

Inventor
L. Blinde.
By Chandler & Chandler
Attorneys.

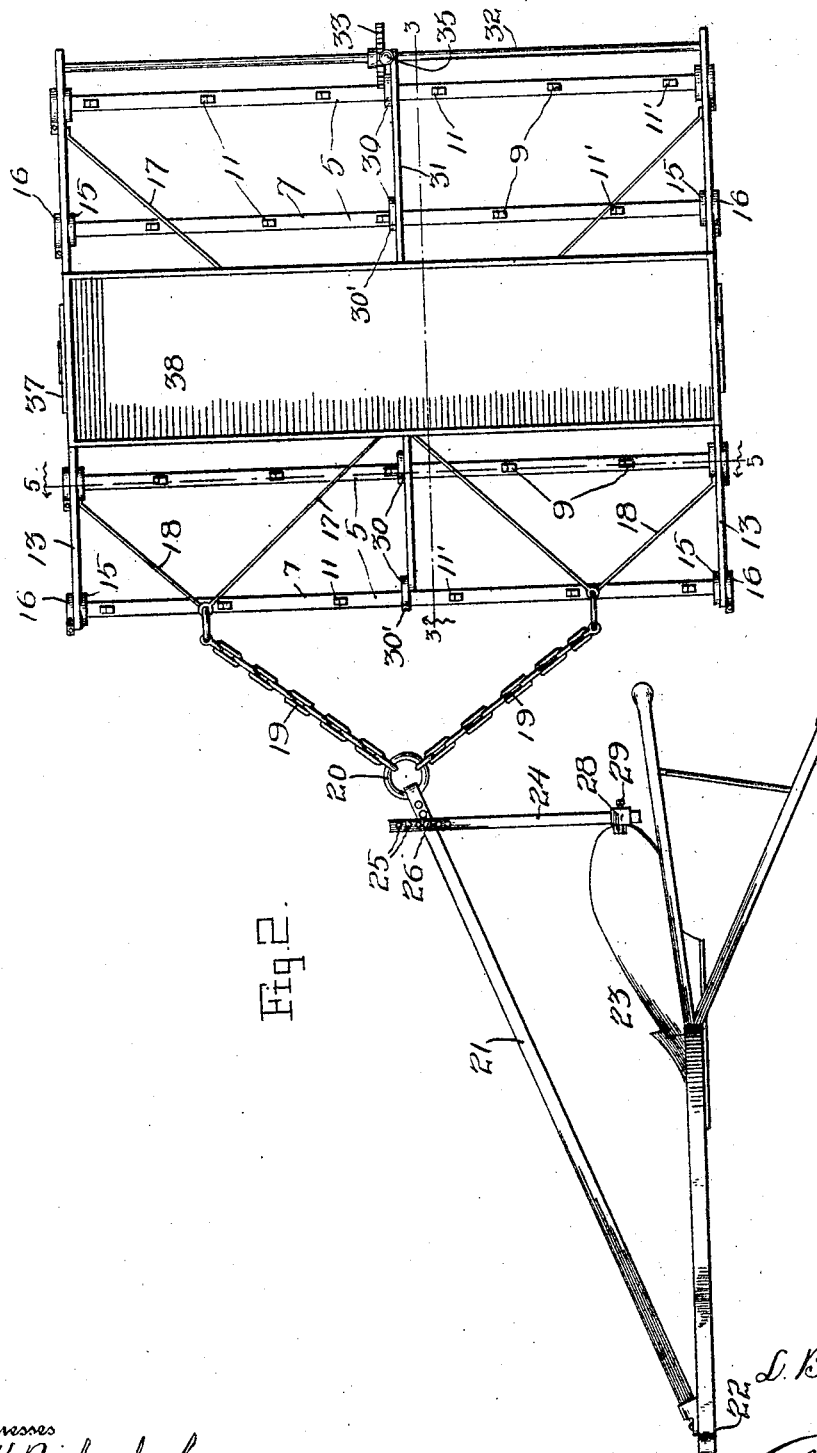

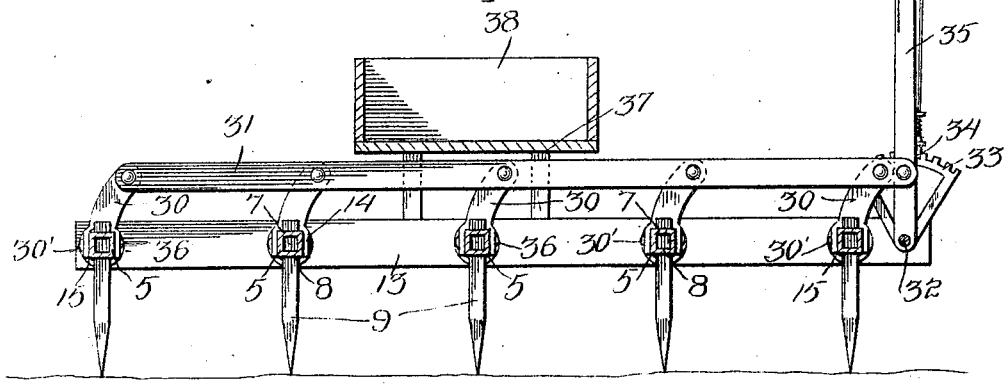
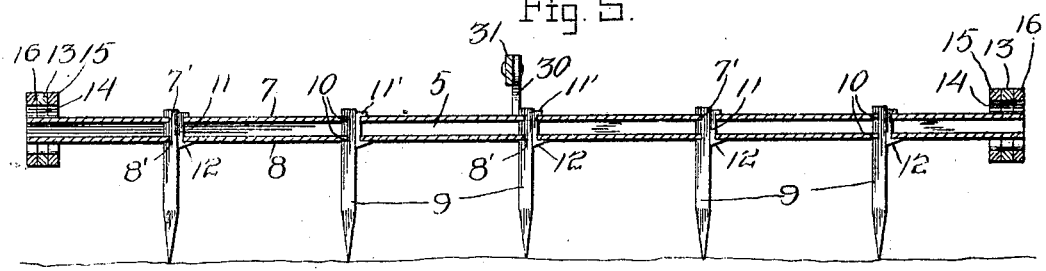

UNITED STATES PATENT OFFICE.

LOUIS BLINDE, OF JOHNSON, NEBRASKA.

HARROW.

No. 804,300.  Specification of Letters Patent.  Patented Nov. 14, 1905.

Application filed March 21, 1905. Serial No. 251,202.

*To all whom it may concern:*

Be it known that I, LOUIS BLINDE, a citizen of the United States, residing at Johnson, in the county of Nemaha, State of Nebraska, have invented certain new and useful Improvements in Harrows; and I do hereby declare the following to be a full, clear, and exact description of the invention, such as will enable others skilled in the art to which it appertains to make and use the same.

This invention relates to cultivating implements, and more particularly to harrows, and has for its object to provide a harrow which may be attached to a plow in such a way that the operations of plowing and harrowing may be performed simultaneously, the harrow being arranged to treat the already-plowed portion of the ground while the plow breaks a furrow at the side of the portion which is being harrowed.

Another object is to provide a harrow in which the teeth may be moved into position to obtain the best results and which will be so arranged that all of the teeth may be moved simultaneously, particular attention being paid to the arrangement and construction of the different parts in order that the cost of constructing the harrows may be kept at a low figure.

Other objects and advantages will be apparent from the following description, and it will be understood that modifications of the specific construction shown may be made and any suitable materials may be used without departing from the spirit of the invention.

Figure 1:
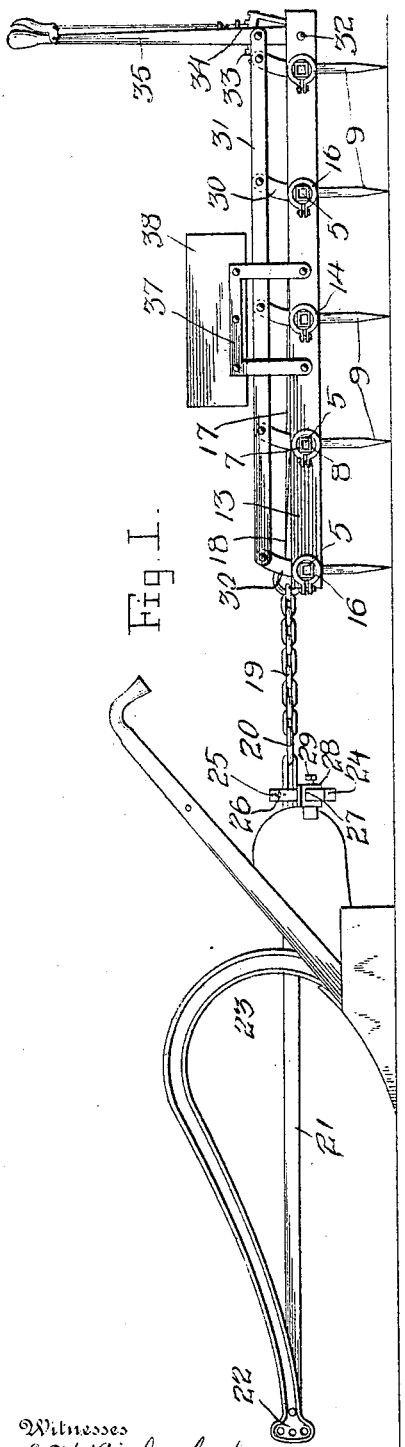
Figure 4:
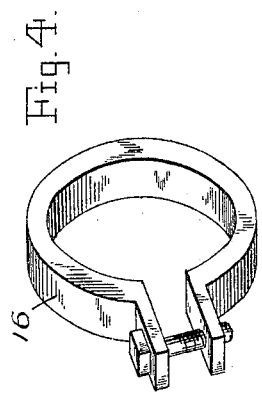

In the drawings forming a portion of this specification, and in which like numerals of reference indicate similar parts in the several views, Figure 1 is a side elevation of the present invention, showing a plow to which it is attached. Fig. 2 is a top plan view of Fig. 1. Fig. 3 is a section on line 3 3 of Fig. 2, showing the tooth-shifting mechanism in side elevation. Fig. 4 is a detail view of one of the collars. Fig. 5 is a longitudinal section of one of the tooth-carrying members, taken on line 5 5 of Fig. 2.

Referring now to the drawings, the present invention comprises transversely-extending tooth-carrying members 5, which are rectangular in cross-section and which are hollow. Formed through the upper and lower portions of these members are 7 and 8, respectively, of these members are alining rectangular openings 7' and 8', respectively, in which are engaged harrow-teeth 9. These teeth are provided with transversely-extending slots 10 in one face, and in these slots are engaged the portions of the members 5 which lie at one side of the openings 7' and 8', the teeth being held in this position by means of pins 11, which are engaged between the unslotted faces of the teeth which lie opposite to their slotted faces and the adjacent edges of the openings 7' and 8'. The pins 11 have heads 11' at one end, which rest against the upper surfaces of the members 5, and the lower ends of the pins are turned to lie against the under faces of the members, as shown at 12, to prevent disengagement of the parts.

Longitudinal connecting-plates 13 are provided, which have circular openings 14 therein in which the end portions of the members are revolubly engaged.

The members 5 have collars 15 engaged therewith inwardly of the plates 13, and outwardly of these plates removable clamping-collars 16 are engaged with the members, it being thus apparent that the plates may be easily removed when desired. The harrow thus has a rectangular form, and diagonally-extending rods 17 are secured to the inner faces of the plates 13 adjacent to their rearward ends, the forward ends of the rods lying between the forward end portions of the plates and having connected therewith rearwardly and outwardly extending rods 18, which are secured to the inner faces of the plates 13 at points between the centers and the forward ends of the latter. Chains 19 are connected with the meeting ends of the rods 17 and 18 and are engaged with a central connecting-ring 20, with which there is connected the rearward end of a forwardly-extending draft-rod 21, which is adapted for connection at its forward end with the clevis 22 of a plow 23. A laterally-extending brace-rod 24 is secured to the rod 21 adjacent to the rearward end of the latter and is adjustable with respect to this rod, the rod 24 having a longitudinal series of openings 25 arranged for interchangeable engagement by a pin 26, which is engaged in the rod 21. At its outer end the rod 24 is engaged slidably in an opening 27, formed in a casting 28, which is adapted for attachment to the moldboard of a plow, as shown in Figs. 1 and 2. The casting 28 has a set-screw 29 therein, which is operable to impinge against the rod 24 to hold this rod against movement in the passage 27. It will be apparent from Figs. 1 and 2 that the harrow is held at one side of a plow to which it is attached and in position to treat the plowed ground, as mentioned in a foregoing portion of this specification.

As shown, the teeth 9 extend downwardly from the members, and by reason of the fact that these members are revolubly engaged in the plates 13 the members are movable to vary the pitch of the teeth. In order that the members may be shifted simultaneously, each member is provided with an upwardly-extending arm 30, the upper ends of these arms being pivoted to a shift-rod 31, the latter extending longitudinally of the harrow. A transversely-extending rod 32 is secured at its ends to the rearward end portions of the plates 13, and secured to this rod there is a notched segment 33, which is disposed for engagement by a dog 34, carried by a hand-lever 35, the latter being pivoted to the rod 32 and having the rearward end of the shift-rod 31 pivoted thereto. The arms 30 have spaced ears 30' at their lower ends, which lie at opposite sides of the members 5, the members and the ears having attaching-bolts 36 engaged therein.

Secured to the plates 13 are upwardly-extending brackets 37, upon which there rests a transversely-extending weight-pan 38, which is adapted for the reception of stone or other suitable heavy material.

It will be understood that variations in the length and specific arrangement of the attaching-rods will be made to suit the proportions of different plows to which the present invention may be attached, and it will also be understood that a plurality of harrows may be connected together for attachment to a single plow.

What is claimed is—

In a harrow the combination with parallel plates having openings therein, of transversely-extending tooth-carrying members revolubly engaged in the openings, teeth removably engaged in the members, upwardly-extending arms carried by the members, a shift-rod pivoted to the arms, a transversely-extending rod secured to the rearward ends of the plates, a hand-lever pivoted upon said transversely-extending rod, said hand-lever being connected with the shift-rod for movement of the latter to shift the tooth-carrying members simultaneously, collars engaged with said members at opposite sides of the plates, crossed rods secured at one end to the inner faces of the plates, other rods secured at one end to the plates and at the other ends to the first-named rods, draft-chains connected to the first and second named rods at their meeting ends, supports secured to the plates and a weight-box mounted upon the supports.

In testimony whereof I affix my signature in presence of two witnesses.

LOUIS BLINDE.

Witnesses:
 AUGUST BLINDE,
 C. C. STONE.